United States Patent [19]

Takabayashi

[11] 3,796,494
[45] Mar. 12, 1974

[54] APPARATUS FOR INTERFEROMETRIC MEASUREMENT OF DISPLACEMENTS

[75] Inventor: Hitoshi Takabayashi, Saitama, Japan

[73] Assignee: Anritsu Electric Co., Ltd., Tokyo, Japan

[22] Filed: Nov. 29, 1971

[21] Appl. No.: 202,768

[30] Foreign Application Priority Data

Nov. 30, 1970  Japan.............................. 45-105013
July 14, 1971  Japan.............................. 46-51750
July 15, 1971  Japan.............................. 46-61622[U]

[52] U.S. Cl. .............................. 356/106 R, 356/110
[51] Int. Cl. .............................................. G01b 9/02
[58] Field of Search ........... 356/106, 107, 108, 109, 356/110, 111, 112, 113

[56] References Cited
UNITED STATES PATENTS 3,692,413  9/1972  Marcy et al.......................... 356/110
3,527,537  9/1970  Hobrough............................. 356/110

Primary Examiner—Ronald L. Wibert
Assistant Examiner—Conrad Clark
Attorney, Agent, or Firm—Kemon, Palmer & Estabrook

[57] ABSTRACT

An apparatus for interferometric measurement of displacements wherein two interferometers each with a movable mirror which are mounted on a carriage in perpendicularly intersecting relationship indicate the displacements of the carriage along the X and Y axes in the number of interference fringes passing a certain point in an interference field of view; the number of interference fringes appearing in the interference field of view of the interferometer is counted by a counter and converted to the value of displacements by an arithmetic calculator; the yawing displacements of the carriage are determined by detecting phase differece between electrcal signals obtained by photoelectrical conversion from different points in the interference field of view; and the signals thus produced actuate a servo mechanism to correct the determined yawing displacements.

8 Claims, 28 Drawing Figures

APPARATUS FOR INTERFEROMETRIC MEASUREMENT OF DISPLACEMENTS

BACKGROUND OF THE INVENTION

This invention relates to an apparatus for interferometic measurement of displacements and more particularly to such apparatus for measuring multi-dimensional displacements.

The prior art interferometric measuring apparatus includes a pair of interferometer each comprising a reference mirror, half mirror and movable mirror fitted to the carriage and disposed in perpendicularly intersecting relationship, thereby counting the number of interference fringes passing a certain point in an interference field when the carriage is moved along the X and Y axes so as to measure the extent of said movements. This apparatus has a common source of light for a pair of interferometers. Since the half and reference mirrors are fixed in the same plane, the two-dimensional displacements of the movable mirror can be determined by these stationary units. However, such conventional apparatus has the drawback that the carriage is likely to present rotations $\Delta\theta$ due to the mechanical inaccuracy of a carriage feeder.

Further, the measurement of the moved length of the carriage by means of the interferometer is effected by counting the changing numbers of interference fringes in an interference field of view. The frequency which interference fringes pass a certain point amounts to about 70Hz even in the case where the carriage is moved at a slow rate namely of 1 mm/min. Said frequency generally ranges from zero to about 100 KHz. Accordingly, the number of interference fringes is counted by a combination of photoelectric and electric measurements.

Identification of the direction in which the carriage travels requires two periodic signals having different phases. These signals consist of two sinusoidal signals each drawn out from two different places in the interference field of view to represent the displacements of the movable mirror. If, in this case, said two signals are drawn out from adjacent places in the interference field of view, then changes in the phase difference of the signals resulting from the rotating displacements or rotating deviation of the carriage can be reduced, thus enabling the stable counting of interference fringes. Since, however, the prior art apparatus cannot determine the rotating displacements of the carriage, the measured values are subject to errors. The errors resulting from said rotating displacements are known as the Abbe errors which define the limit of determination.

Therefore, to remodel the conventional apparatus into a type capable of displaying the same degrees of measurement accuracy as the generally obtained interferometric sensitivity which should be sufficient to indicate 0.3 to 0.02 microns of the moved length of the carriage, there is no other available method than machining the carriage feeding mechanism of said apparatus with superhigh precision. However, this operation practically presents extremely great difficulties.

A device for correcting the measured movement of the carriage by generating signals to detect rotating displacements resulting from said movement and actuating a servo mechanism according to said detected signals is already disclosed in "Ruling of Large Diffraction Gratings with Interferometric Control," Journal of the Optical Society of America, Vol. 47, pp 15 to 22, 1957.

However, this device is primarily intended for unidimensional measurements. It consists in feeding the carriage at a constant rate, detecting electric signals having a certain frequency from the movement of interference fringes at a constant speed, comparing the phase of the detected signals with that of a reference signal using an ordinary phase difference measuring device or detector hereafter called phase difference detector thereby determining phase differences between these two types of signals. For such device, however, the carriage should be moved at an extremely constant rate, presenting considerably technical difficulties in application to multidimensional measurements of displacements with variable carriage velocity.

SUMMARY OF THE INVENTION

This invention is intended to provide an apparatus for interferometric measurement of displacements which consists in detecting the rotating displacements or rotating deviations of the movable mirror, carrying out corrections according to the detected signals from the interferometer mechanically or electrically in order to elevate measurement accuracy.

According this invention, there are provided two perpendicularly intersecting interferometers each including movable mirrors fitted to a carriage. In the interference field of view of each unit, are disposed photoelectric converters, output signal from which are supplied to a counter and phase difference detector. The counter counts the number of interference fringes passing a certain point in the interference field of view. The phase difference detector determines the angle of the carriage rotation. Signals obtained by said phase difference detector are used mechanically to correct the detected rotating angle through a control device.

DETAILED DESCRIPTION OF THE INVENTION

Figure 1:
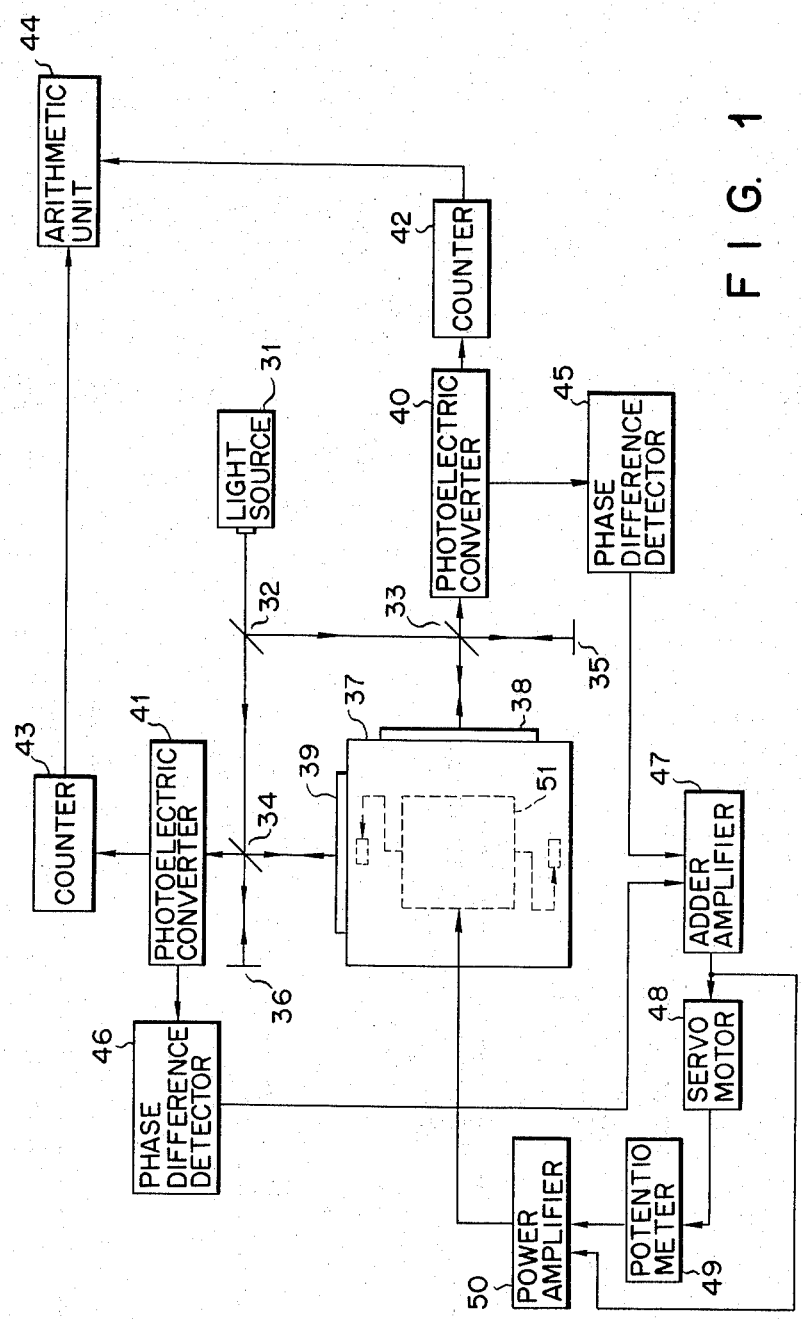
FIG. 1 is a block diagram of an interferometric displacement measuring apparatus according to an embodiment of this invention.

There will now be described by reference to FIGS. 1 to 19 an interferometric displacement measuring apparatus. Referring to FIG. 1, a beam from a source of monochromatic light 31 is separated into two parts by a half mirror 32. The divided parts proceed to other half mirrors 33 and 34, by which they are further divided into two parts. They are conducted to fixed reference mirrors 35 and 36 and movable plane mirrors 38 and 39 fitted to the adjacent sides of a carriage 37. The light beams reflected by the reference mirrors 35 and 36 and movable plane mirrors 38 and 39 are returned to the aforesaid half mirrors 33 and 34. The light beams interfered by each other on the half mirrors are detected by photoelectric converters 40 and 41 disposed at two specified places to be converted to electric signals. Output signals from said photoelectric converters 40 and 41 are counted by counters 42 and 43. The results of counting by said counters 42 and 43 are operated by an arithmetic unit to indicate the amounts of displacement in the form converted to units of length. The two sets of electric signals obtained from the photoelectric converters 40 and 41 are conducted to the corresponding phase difference detectors 45 and 46. The rotating displacements of the carriage are determined from changes in a phase difference between said electrical signals in each set. A phase difference detector to be employed for detecting from such signals the variation of the phase difference is able to function despite the carriage which moves at an ever changing speed and respond to a slight shock or vibration of the carriage. Detected outputs from said detectors 45 and 46 are added together to be amplified by an adder amplifier 47 and then conducted to a servo motor 48 which is consequently put into operation to actuate a potentiometer 49. Output from said potentiometer 49 and that from the adder amplifier 47 are added together to be amplified by an amplifier 50 and supplied to a servo actuator 51 fitted to the carriage 37 for its energization, thereby to correct the rotating displacements of the latter.

Figure 2:
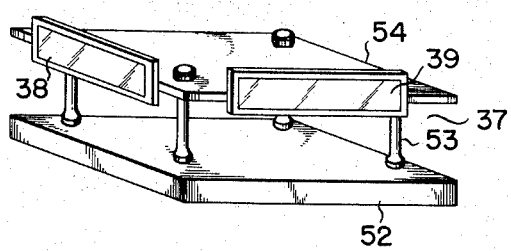
FIG. 2 is a perspective view of the carriage of the apparatus of FIG. 1.
Figure 3:
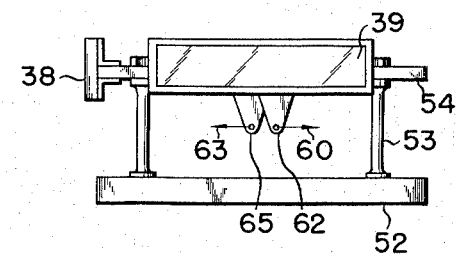
FIG. 3 is a side view of the carriage of FIG. 2.
Figure 4:
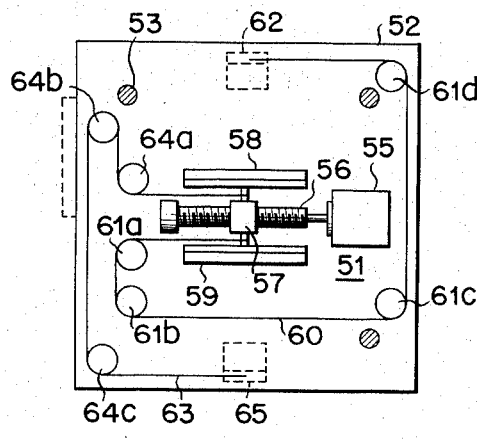
FIG. 4 is a top view of the movable base of the carriage of FIG. 2.

The carriage 37 includes, as illustrated in FIG. 2, four support pillars 53 of elastic material erected on a carriage base 52 and a carriage plate 54 mounted on said support pillars 53. To the edges of two adjacent sides of the carriage plate 54 are fitted the movable mirrors 38 and 39. Another servo motor 55 (FIG. 4) is fixed on said carriage 52. The shaft of said servo motor 55 is mechanically connected to a lead screw 56 for its rotation which is engaged by a screw-threaded nut 57. This nut 57 travels in the axial direction of the lead screw along the guide members 58 and 59 disposed on both sides of said nut 57. To one end of the nut 57 is connected one end of a wire 60, the other end of which is fastened to a projection 62 (FIG. 3) disposed on the underside of the carriage plate 54 through guide reels 61a, 61b, 61c and 61d. To the other end of the nut 57 is connected one end of a wire 63, the other end of which is connected through guide reels 64a, 64b and 64c to a projection 65 (FIG. 3) similarly disposed on the underside of the carriage plate 54 opposite to the aforementioned projection 62.

There will now be described the operation of the carriage 37 arranged as described above. First, the servo motor 48 is driven to adjust output from the potentiometer 49 and the output torque of the other servo motor 55 is so varied as to reduce a sum of outputs from the phase difference detectors 45 and 46 to zero. When, under this condition, the carriage base 52 travels, it presents rotating displacement due to errors in machining its guide surface, causing the carriage plate 54 fitted with the movable mirrors 38 and 39 to indicate the corresponding rotating displacements. As the result of the rotating displacements of the carriage plate 54, there is produced positive or negative output from the phase difference detectors 45 and 46 according to the direction in which said carriage plate 54 rotates. Outputs from said detectors 45 and 46 actuate the servo motor 48 to increase or decrease output from the potentiometer 49. Outputs from the potentiometer and adder amplifier 47 are conducted to drive the servo motor 55 included in the servo actuator 51. The drive of said servo motor 55 leads to the rotation of the lead screw 56 and the forward movement of the nut 57. The nut 57 supplies by its travel the projections 62 and 65 formed on the underside of the carriage plate 54 with forces acting in opposite directions in a horizontal plane through the wires 60 and 63. Accordingly, the carriage plate 54 is subject to coupled forces of rotation corresponding to the rotation of the carriage base 52 and acting against the elastic restoring forces of the support pillars 53. The magnitude of said coupled forces varies with outputs from the adder amplifier 47 and potentiometer 49, thereby causing the carriage plate 54 to rotate in corresponding relationship to the movement of the carriage base 52. The rotation of the carriage plate 54 is so controlled that the normals of the movable mirrors 38 and 39 fitted to said plate 54 are always aligned with the initially set direction. Accordingly, the rotating displacements of the carriage plate 54 resulting from the movement of the carriage base 52 is controlled with high precision, enabling said plate 54 and moval mirrors 38 and 39 to move in very accurate parallel relationship with the stationary members. Since the deviation of the carriage plate 54 of the carriage 37 as a whole is mechanically corrected, accurate measurement can be made without the necessity of particularly correcting the values counted by the counters 42 and 43. Experiments show that the aforesaid parallelism could be maintained at a level of less than 0.1 arc sec. This means that the difference of displacements between two points on the carriage plate 54 200mm apart from each other indicated $200 \times 0.1 \times 5 \times 10^{-6}$ to $10^{-4}$ mm, that is, less than 0.1 micron generally demanded of interferometric sensitivity.

The foregoing embodiment relates to the case where correction was made of the displacements of the carriage 37 when it rotated around a vertical axis. Actually, however, the carriage 37 also presents displacements when it rotates around a horizontal axis, that is, pitching displacements. The apparatus of this invention enables even correction of said pitching displacements.

Figure 5:
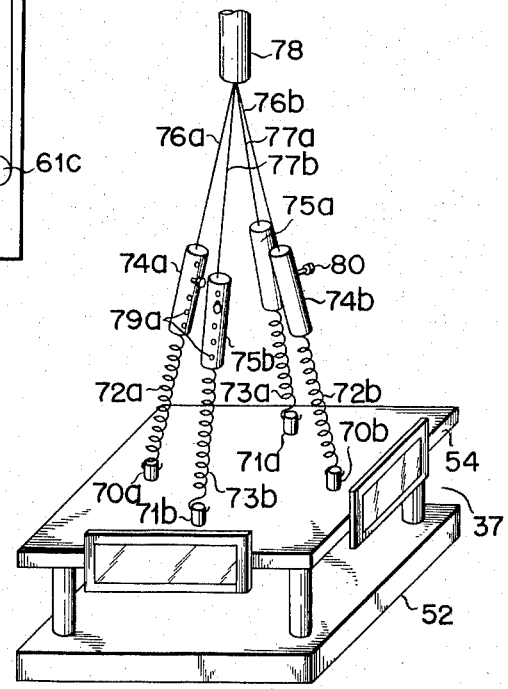
FIG. 5 is a perspective view of the carriage of FIG. 2 to which there is added a mechanism for correcting the pitching displacements of the carriage of FIG. 2.

Referring to FIG. 5, there are formed on the carriage plate 54 of the carriage 37 projecting fitting pins 70a and 70b at the center of the forward and rear sides in the direction of x and similar projecting fitting pins 71a and 71b at the center of the forward and rear sides in the direction of y. The head of said fitting pins 70a, 70b, 71a and 71b is connected to one end of each of the corresponding coil springs 72a, 72b, 73a and 74b. The other ends of said coil springs 72a, 72b, 73a and 74b are jointly connected to a fulcrum section 78 through the corresponding spring force adjusters 74a, 74b, 75a and 75b formed into a hollow cylindrical shape and connection wires 76a, 76b, and 77a and 77b. This arrangement suspends the carriage plate 54 from the fulcrum section 78. The coil springs 72 a, 72b, 73a and 73b normally urges the carriage 37 upward, and partially adjusts the pressure with which the carriage 37 as a whole abuts against the guide surface of a separate member. The spring force adjusters 74a, 74b, 75a and 75b adjust the effective length of the coil springs 72a, 72b, 73a and 73b to vary their elastic constant, that is, their upward acting tensile force relative to their elongation. Adjustment of the force of said springs 72a, 72b, 73a and 73b is effected by forcing an engagement pin 80 into one of insertion parts 79 formed in the peripheral wall of the hollow cylindrical adjusters 74a, 74b, 75a and 75b so as to catch the desired part of the upper end portion of the coil springs 72a, 72b, 73a and 73b pulled into said adjusters.

There will now be described the operation of a mechanism for correcting the aforesaid pitching displacements of the carriage 37. For example, where the carriage base 52 is guided to the left in the direction of x, then the fitting pin 70a fixed on the forward side of the carriage plate 54 as viewed in the travelling direction of the carriage base 52 is spaced further apart from the fulcrum section 78, whereas the fitting pin 70b disposed on the rear side of the carriage plate 54 drawn nearer to the fulcrum section 78. As apparent from this fact, the varying distances between the fulcrum section 78 and said two fitting pins 70a and 70b, that is, changes in the forces acting on the fulcrum section 78 constitute a quadratic function of the moved length of the carriage 37. As a rule, the center of gravity of the carriage 37 is shifted in the direction in which the carriage 37 slides over the guide surface of a separate member, with the result that the carriage exhibits very fine pitching displacements. Since, according to the experiment, the angle of said pitching is proportional to the shifting of the center of gravity the vertical movement of the fitting pins 70a and 70b together with the carriage 37 constitutes a quadratic function of the pins travel in the directions of x and y. When the carriage 37 moves to the left as viewed from FIG. 5, the fulcrum section 78 receives the varying forces of the coil springs 72a and 72b. The aforesaid vertical movement of the forward and rear fitting pins 70a and 70b is counterbalanced by said varying forces, that is, correction forces. If, therefore, the elastic constant of the coil springs 72a and 72b, or the distance between the fitting pins 70a and 70b themselves is so chosen in advance as to attain the abovementioned counterbalancing effect, then the carriage 37 can travel without any pitching displacement at all. This holds true with the movement of the carriage 37 in any other directions than to the indicated left side.

There will now be described by reference to FIGS. 6 and 7 another device for correcting the pitching displacements of the carriage 37. The carriage 37 is so disposed as to move, for example, to the indicated left and right sides over a guide 86 by being carried on guide rollers 85. To both sides of the indicated left and right end portions of the guide board 86 are attached fitting plates 87 horizontally projecting from said left and right end portions. To the outer ends of the fitting plates 87 are fixed support rods 88a, 88b, 89a and 89b substantially at right angles. In the lower part of the support rod is formed a vertically elongated sliding slit 90. To the fitting plate 87 is connected by thread engagement an operating screw 91 through the sliding hole 90. This operating screw 91 is normally fixed and only loosened when the support rod is made to slide vertically for adjustment, and again tightened when brought to the desired position. To both sides of the carriage 37 are fitted pulleys 92a, 92b, 93a and 93b two on each side through fitting arms 98a, 98b, 99a and 99b. Between the support rods 88a amd 89a as well as between the support rods 88b and 89b mutually facing in the travelling direction of the carriage 37 are stretched wires 94a and 94b respectively. These wires 94a and 94b upwardly support the carriage 37 through the pulleys 92a, 92b, 93a and 93b. Accordingly, the pulleys 92a, 92b, 93a and 93b roll on the wires 94a and 94b when the carriage 37 travels. The tension of the wires 94a and 94b is controlled by adjusting adjusters 95a and 95b fitted to the support rods 89a and 89b which consist of nuts 96a and 96b and screws 97a and 97b engaged therewith.

There will now be described the operation of a pitching displacement correcting device arranged as described above. When the carriage 37 is located at the center of the guide board 86, those portions of the wires 94a and 94b which are defined between the pulleys 92a and 93a as well as between the pulleys 92b and 93b sag to a maximum extent, the extent of said sagging being progressively reduced as the carriage 37 is further moved, for example, to the indicated left side. As the result of said movement of the carriage 37, the force of the wires 94a and 94b acting on the forward pulleys 92a and 92b gradually increase, whereas the force of said wires 94a and 94b acting on the rear pulleys 93a and 93b progressively decrease. These automatically varying forces of the wires 94a and 94b of correction forces constitute a quadratic function of the moved length of the carriage 37. If, therefore, the tension of the wires 94a and 94b and the height of the support pillars 88a, 88b, 89a and 89b are properly chosen in advance, the carriage 37 can move without any ptiching displacement.

Figure 6:
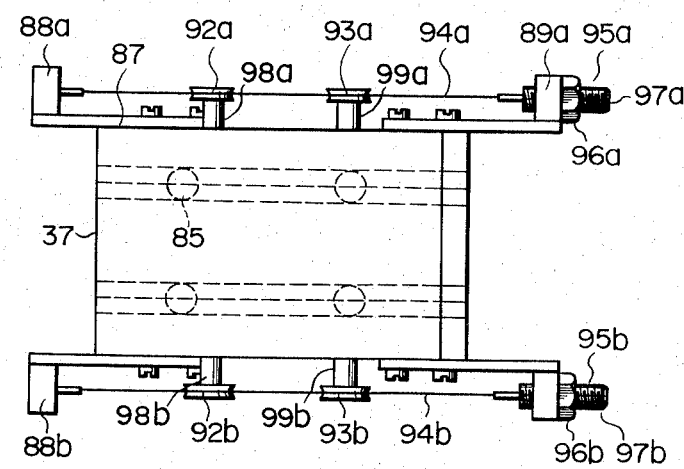
FIG. 6 is a top view of a carriage according to another embodiment of the invention which is provided with a modification of said pitching displacement correcting mechanism.
Figure 7:
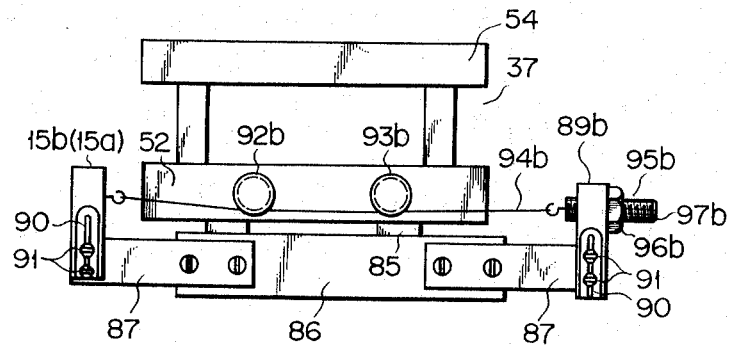
FIG. 7 is a side view of the carriage of FIG. 6.

The foregoing description of the pitching displacement correcting device illustrated in FIGS. 6 and 7 relates to the case where the carriage 37 was made to move in a unidimensional direction. However, a combination of two such devices having the same arrangement enables the carriage 37 to travel in bidimensional directions without pitching displacements.

Figure 8:
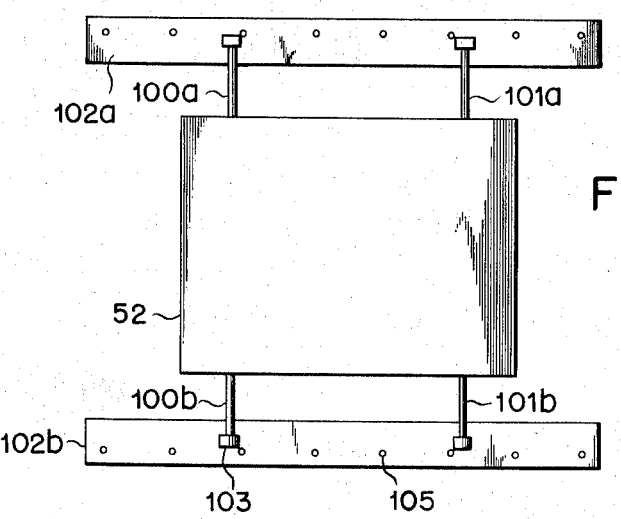
FIG. 8 is a top view of the carriage according to still another embodiment of the invention provided with a modification of said pitching displacement correcting mechanism.
Figure 9:
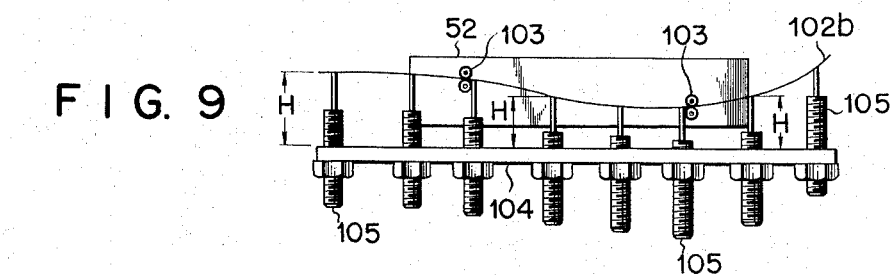
FIG. 9 is a side view of the carriage of FIG. 8.

There will now be described by reference to FIGS. 8 and 9 a third device for correcting pitching displacements. To both sides of the forward and rear end portions of the carriage 37 in its travelling direction are projectively fixed fitting arm assemblies 100a, 100b and 101b each of which consists of a pair of unit arms disposed one on the other. To the outer end of the respective arm assemblies are rotatablly fitted a pair of rollers 103. On both sides of the carriage 37 in its travelling direction are disposed ribbon-shaped plate springs 102a and 102b, which are each held between said pair of rollers 103. The ribbon-shaped plate springs 102a and 102b are formed into a prescribed curved shape and maintained at various heights as measured from the upper surface of a support table 104 which represent the expected pitching displacements of the carriage 37 during its travel. The various heights of the curved portion of the plate spring can be adjusted by changing the height of the support rods 105 penetrating said support table 104. According to the pitching displacement correcting device shown in FIGS. 8 and 9, where the carriage 37 is supposed to present a pitching displacement in a counterclockwise direction as viewed from FIG. 9 when it is brought to a certain place on a separate guide plate or passes said place, that part of the curved plate spring which represents the extent of said expected pitching displacement is previously chosen to have a relatively great height. Conversely where the pitching displacement tends to take place in a clockwise direction, the aforesaid part of the curved plate spring is set in advance at a relatively low level.

There will now be described the operation of the pitching displacement correcting device of FIGS. 8 and 9. When, as the result of the movement of the carriage 37, the forward paired rollers 103 fixed to the fitting arms 95a and 95b clamp those parts of the plate springs 102a and 102b which are previously chosen to have a relatively great height, then the end of the elastic fitting arm assemblies 100a and 100b is elastically curved upward to supply the carriage 37 with a reaction proportional to said deformation, thereby counterbalancing a pitching displacement occurring therein. As described above, the fitting arm assemblies 100a, 100b, 101a and 101b are subject to an elastic reaction according to the curvature of the plate springs 102a and 102b as the result of the travel of the carriage 37. If, therefore, previous determination is made of the extent of the pitching displacement of the carriage 37 at a given point and the various parts of the plate springs 102a and 102b are chosen to have prescribed heights H by adjusting the position of the support rods 105, then the pitching displacements of the carriage 37 are offset by the correction force derived from the curved form of the plate springs 102a and 102b, enabling the carriage 37 to move without any pitching displacement.

There will now be described the movable mirrors 38 and 39 fitted to the carriage 37. Said movable mirrors 38 and 39 are generally of a type having good optical flatness. While a mirror may be lapped to obtain a satisfactory flatness, the undermentioned process facilitates manufacture.

A plate-like material, for example, a plane mirror under a normal condition is supposed to give rise to deformation by three kinds of assumed external forces, that is, (i) a distributed moment, (ii) a shearing force both acting on the edge of the plate and (iii) a pressure applied to the central part of the plate. Now let deviations of the flatness of the plate from the ideal flatness at various points thereon under normal condition be designated as $w(x, y)$. The forces supposed to produce the aforesaid deviations $w$ consist of a moment $M(n, t)$, a shearing force $Q(n, t)$ acting on the edge of the plate and a pressure $P(x, y)$ perpendicularly acting on the surface thereof. The characters $n$ and $t$ represent the normal and the tangential direction at the edge of the plate respectively.

Substituting $w$ in the known differential equation representing the deflection of the plate as a value of said deflection, then the associated pressure $P(x, y)$ is determined.

$$P(x, y) = -D\Delta\Delta w(x, y) \tag{1}$$

where:

$D = $ the flexural rigidity of the plate

The values of $M(n, t)$ and $Q(n, t)$ are determined from the following equations.

$$M(n, t) = -D\left[(\partial^2 w/\partial n^2) + \nu(\partial^2 w/\partial t^2)\right] \tag{2}$$

$$Q(n, t) = -D\{(\partial^3 w/\partial n^3) + (2-\nu)(\partial^3 w/\partial n \,\partial t^2)\} \tag{3}$$

If, therefore, there are applied to the plate a pressure $-P(x, y)$, moment $-M(n, t)$ and shearing force $-Q(n, t)$ representing the values reversed from those indicated by the aforementioned external forces used in the equations (1), (2) and (3) above, then the deviations $W(x, y)$ are counterbalanced, enabling the surface of the plate to have an ideal flat plane.

Figures 10, 11:
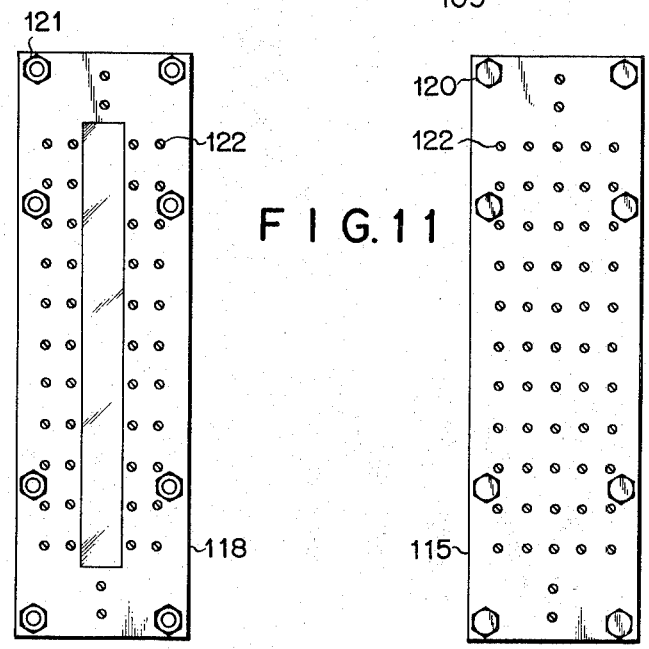
FIG. 10 is an elevation of a movable mirror used in the apparatus of FIG. 1.
FIG. 11 is a back view of the movable mirror of FIG. 10.
Figure 12:
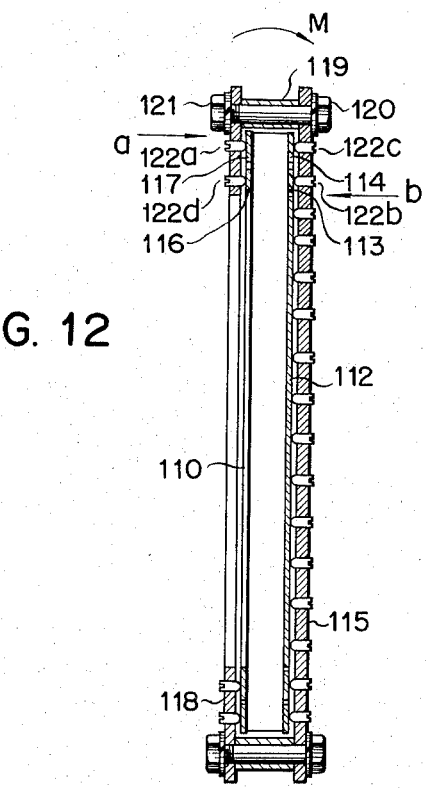
FIG. 12 is a side sectional view of the movable mirror of FIG. 10.

The movable mirror is manufactured on the basis of the above-mentioned theory. Referring to FIGS. 10 to 12, there is pressed a thin rectangular sheet 112 against the central part of the backside of a rectangular plane mirror 110. Around said thin sheet 112 are disposed thin rectangular rings 113 and 114 coaxially at a prescribed interval. To the backside of the mirror 110 is further fitted a rectangular elastic substrate 115. Around the front periphery of the mirror are attached thin rectangular rings 116 and 117 coaxially at a prescribed interval. On the front edge of the mirror 110 is mounted a rectangular ring-shaped elastic keep plate 118. Outside of the entire periphery of the mirror 110 are disposed a plurality of pipes 119 of equal length at a prescribed space so as to bridge the substrate 115 and keep plate 118. The substrate 115, pipes 119 and keep plate 118 are penetrated by a bolt 120, with the exposed end of which there is engaged a nut 121 to fix them jointly.

The substrate 115 and keep plate 118 are bored with a plurality of screw holes into which there are fitted adjustment screws 122, the inner end of which is pressed against the mirror 110 through the thin sheet 112, and thin rings 113, 114, 116 and 117. When, under this condition, the adjustment screws 112a and 122b are so turned as to cause their ends to press the mirror 110 in the directions of the indicated arrows a and b respectively, then the mirror 110 receives a moment acting in the direction of the indicated arrow M. Where adjustment screws 122c and 122d are tuned the mirror 110 receives an opposite moment to the preceding case. When there is applied pressure to the mirror 110 by turning the mutually facing paired adjustment screws 122, there is obtained a required moment. When these adjustment screws are worked individually there results a shearing force. When there are turned the adjustment screws 122 on the periphery of the mirror 110 there is applied pressure to said section. When there are worked the adjustment screws 122 fitted to the central part of the substrate 115, there is applied pressure to said section. When, therefore, adjustment is conducted by operating a proper combination of the adjustment screws 122, it is possible to eliminate the residual deformation of the mirror 110, enabling it to have an ideal or approximately ideal plane.

Figure 13:
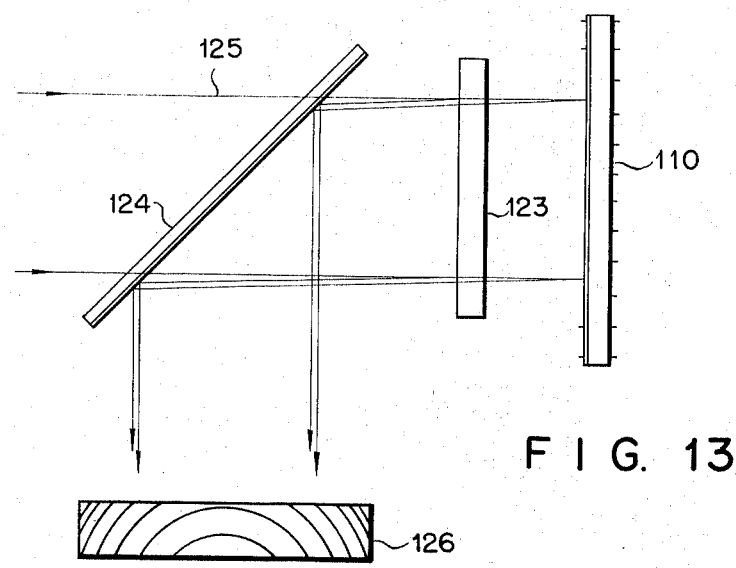
FIG. 13 illustrates the manner in which the movable mirror of FIG. 10 is adjusted.

It is advisable to carry out the aforesaid adjustment by disposing, as illustrated in, for example, FIG. 13, a standard transparent plane plate 123 ahead of a plane mirror 110 being adjusted in parallel relationship, locating a half mirror 124 slantwise facing said transparent plate 123, projecting parallel beams of light 125 through said half mirror 124 at right angles to said transparent plate 123 and while observing interference fringes 126 through said half mirror 124, properly working the adjustment screws 122 so as to eliminate the curvature of said interference fringes 126. This process of adjustment easily reduces irregularities on the surface of the mirror 110 to less than one-tenth of those originally occurring thereon. A ground plane mirror generally has such a flatness as can be indicated by about one interference fringe or a single wave length. If a plane mirror thus ground is constructed as illustrated in FIG. 12, then it can be made always to display an extremely even plane whose flatness amounts to less than $\lambda/10$, that is, one-tenth of a single wave length.

There will now be described a phase difference measuring device. Before referring thereto, however, there will be explained the generation of interference fringes.

Figure 14:
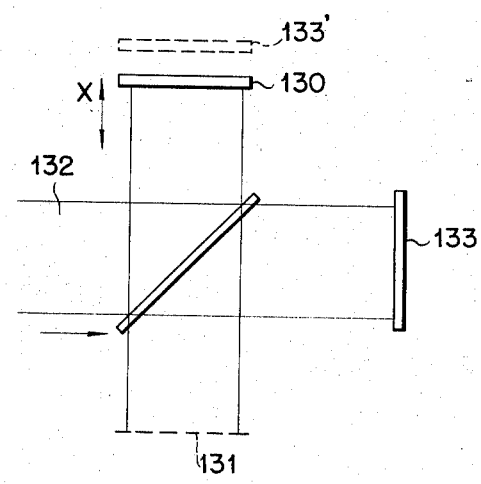
FIG. 14 presents the principle whereby the interferometer is operated.
Figure 15:
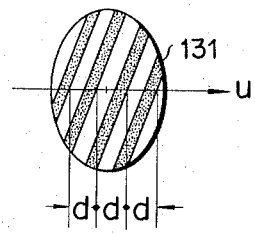
FIG. 15 shows interference fringes appearing on the screen of the interferometer.

FIG. 14 is a schematic illustration of the principle by which there is operated a Michelson type interferometer also used in the apparatus of this invention. When the mirror 130 of said interferometer is made to travel, then the interference fringes (FIG. 15) appearing in an interference field of view 131 also move. If there is counted the number of interference fringes passing a certain point on said interference field of view, then there can be determined the moved length of the mirror 130. It will be noted, however, that the mirror 130 presents an inclination, though extremely small, while it is moving. Generally, this inclination is of such magnitude as to give rise to errors which can not be overlooked.

Now let an abscissa u (FIGS. 15 and 16) be provided in the interference field of view. Then the brightness I on the axis of said abscissa may be expressed as a function of the movement of the mirror by the following equation.

$$I = Z_0 \{1 - \cos[(2\pi/a)u - (4\pi/\lambda)]\}$$

(4)

where:
$a =$ interval of interference fringes as measured in the direction of $u$
$\lambda =$ wave length of monochromatic light 132 used
$x =$ movement of the mirror 130

It will be noted that the above equation relates to the case where the position taken by the mirror when the dark lines of interference fringes pass a point of $u = 0$ is considered as the base of its movement. These interference fringes constitute a sinusoidal function of the movement of the carriage and, where the mirror included in the interferometer has a satisfactory flatness, can also be used as a sinusoidal function of a given point in the interference field of view. Let it be assumed that interference fringes were observed at points $u_1, u_2$. Then there are generated light signals expressed by the following equations.

$$I_1 = I_0 \{1 + \sin(4\pi/\lambda x + \delta_1)\}$$
$$I_2 = I_0 \{1 + \sin(4\pi/\lambda x + \delta_2)\}$$
$$I_3 = I_0 \{1 + \sin(4\pi/\lambda x + \delta_3)\}$$

(5)

If the angle between the virtual image 133' of the reference mirror and the mirror 130 is represented by $\theta$, then there results the known relationship $d\theta = \lambda/2$. That is, $d$ varies with $\theta$. With, therefore, $\delta_1$ taken as the base in the equation (5), a difference between $\delta_1$ and $\delta_2$ and that between $\delta_1$ and $\delta_3$ also change. Conversely, variations in $\theta$ can be determined from changes in said differences.

Figure 16:
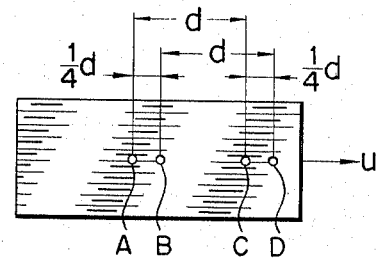
FIG. 16 is an enlarged view of the interference fringes of FIG. 15.

The aforementioned interferometric apparatus determines $\theta$ in the following manner. There are perforated, as shown in FIG. 16, four pin holes A, B, C and D on the abscissa axis u of an interference field of view 131. From these pin holes A, B, C and D are drawn out light signals. Said pin holes are located in the following relationship.

$$\overline{AC} = \overline{BD} \approx d$$
$$\overline{AB} = 1/4\,\overline{AC}$$

Where $d$ represents a distance between the central parts of interference fringes appearing in parallel at a certain inclination to the central line of the interference field of view. FIG. 16 indicates the brightness of interference fringes in the density of horizontal lines. With such arrangement, there are drawn out from the aforesaid pin holes light signals which may by expressed by the following equation.

$$\overline{I_A} = I_0 \{1 + \sin(4\pi/\lambda)x\}$$
$$I_B = I_0 \{1 + \cos(4\pi/\lambda x + \delta)\}$$
$$I_C = I_0 \{1 + \sin(4\pi/\lambda x + 4\delta)\}$$
$$I_D = I_0 \{1 + \cos(4\pi/\lambda x + 5\delta)\}$$

(6)

While $\delta$ given in the above equation (6) has a smaller value than $2\pi$, it of course varies if the inclination $\theta$ of the mirror image 133' to the mirror 130 changes (FIG. 14).

Figure 17:
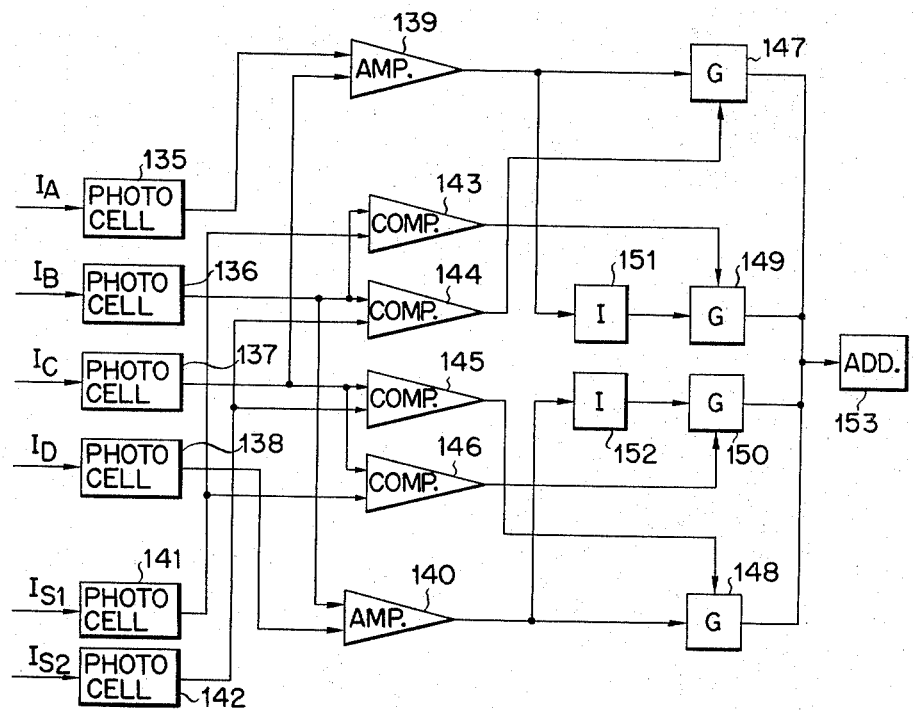
FIG. 17 is a block circuit diagram of a phase difference detector used in the interferometric displacement measuring apparatus of the invention.

Light signals appearing at the aforementioned pin holes A, B, C and D are converted, as shown in FIG. 17, into electrical signals by photo-cell 135 to 138, outputs from which may respectively be expressed by the following equations.

$$I_{135} = 1 + \sin(4\pi/\lambda)x$$
$$I_{136} = 1 + \cos[(4\pi/\lambda)x + \delta]$$
$$I_{137} = 1 + \sin[(4\pi/\lambda)x + 4\delta]$$
$$I_{138} = 1 + \cos[(4\pi/\lambda)x + 5\delta]$$

(7)

The above outputs have a frequency proportional to the moving speed of the mirror and generally indicating about 30 KHz for the moving speed of 10 mm/sec. Of said outputs, those which become equal in every respect when the phase difference $\delta$ is reduced to zero, that is, a group of $I_{135} - I_{137}$ and a group of $I_{136} - I_{138}$ are supplied to differential amplifiers 139 and 140 respectively. Outputs $I_{139}$ and $I_{140}$ from these differential amplifiers 139 and 140 respectively may be expressed by the following equations.

$$I_{139} = \sin[(4\pi/\lambda)x + 4\delta] - \sin(4\pi/\lambda)x$$
$$I_{140} = \cos[(4\pi/\lambda)x + 5\delta] - \cos[(4\pi/\lambda)x + \delta]$$

(8)

On the other hand, substantially stable light signals $IS_1$ and $IS_2$ which are proportional to the intensity of a light source are converted into D.C. electrical signals $I_{141}$ and $I_{142}$ by other photo-cell 141 and 142. These electrical signals $I_{141}$ $I_{142}$ may respectively be expressed by the following equations.

$$I_{141} = 1 + 1/\sqrt{2}$$
$$I_{142} = 1 - 1/\sqrt{2}$$

(9)

The D.C. signal $I_{141}$ is conducted to comparators 143 and 146 together with output signals $I_{136}$ and $I_{137}$ from the photoelectric converters 136 and 137, whereas the D.C. signal $I_{142}$ is supplied to comparators 144 and 145 together with output signals $I_{135}$ and $I_{138}$ from the photocell 135 and 138. Outputs $I_{143}$, $I_{144}$, $I_{145}$ and $I_{146}$ from said comparators 143 to 146 may respectively be expressed by the following equations.

In case of $\cos[(4\pi/\lambda)x + \delta] - 1/\sqrt{2} > 0$ $I_{143} = 1$

In case of $\cos[(4\pi/\lambda)x + \delta] + 1/\sqrt{2} < 0$ $I_{144} = 1$

In case of $\sin[(4\pi/\lambda)x + 4\delta] - 1/\sqrt{2} > 0$ $I_{145} = 1$

In case of $\sin[(4\pi/\lambda)x + 4\delta] + 1/\sqrt{2} < 0$ $I_{146} = 1$ (10)

In other cases, said outputs $I_{143}$ to $I_{146}$ are so controlled as to indicate zero. Output $I_{139}$ from the differential amplifier 139 and output $I_{144}$ from the comparator 144 are supplied to a gate 147, while output $I_{140}$ from the differential amplifier 140 and output $I_{145}$ from the comparator 145 are conducted to a gate 148. A gate 149 is supplied through an inverter 151 with output $I_{139}$ from the differential amplifier 139 and output $I_{143}$ from the comparator 143, while a gate 150 is supplied through an inverter 152 with output $I_{140}$ from the differential amplifier 140 and output $I_{146}$ from the comparator 146. Outputs from said gates 147 to 150 are summed up by an adder 153 and there is determined a phase differential on the basis of output from the adder 153. The gates 147 to 150 are opened when outputs from the corresponding comparators 143 to 146 indicate "1." A sum of signals brought into the adder 153 in case of $0 < X < \lambda/2$ may be expressed as follows.

$$2\int_{-\frac{\lambda}{4\pi}\left(\frac{\pi}{4}+\delta\right)}^{\frac{\lambda}{4\pi}\left(\frac{\pi}{4}-\delta\right)} \left\{\sin\left(\frac{4\pi}{\lambda}x + 4\delta\right) - \sin\frac{4\pi}{\lambda}x\right\} dx$$

$$+ 2\int_{\frac{\lambda}{4\pi}\left(\frac{\pi}{4}-4\delta\right)}^{\frac{\lambda}{4\pi}\left(\frac{3\pi}{4}-4\delta\right)} \left\{\cos\left(\frac{4\pi}{\lambda}x + 5\delta\right) - \cos\left(\frac{4\pi}{\lambda}x + \delta\right)\right\} dx$$

$$= \frac{2\sqrt{2}}{\pi} \sin 2\delta \cos \delta \quad (11)$$

An average output from the adder 153 is determined simply by dividing the value of the above equation (11) by the integral interval $\lambda/2$.

$$I_{153} = 4\sqrt{2}/\pi \sin 2\delta \cos \delta$$

(12)

Figure 18A:
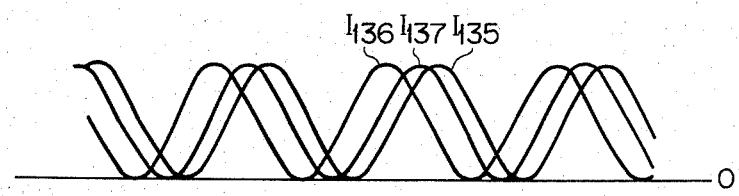
FIGS. 18A, 18B, 18C and 18D indicate the wave forms of signals generated from the various parts of the phase differnce detector of FIG. 17.

FIG. 18A indicates for comparison the wave forms of inputs $I_{135}$ and $I_{137}$ to the comparator 139 and that of the other signal $I_{136}$.

Figure 18B:
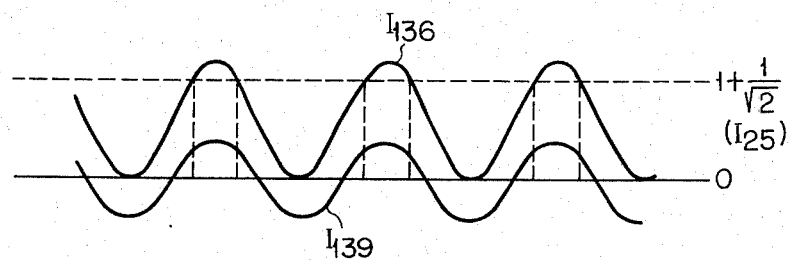

FIG. 18B shows the wave form of output $I_{139}$ from the differential amplifier 139 and those of inputs $I_{136}$ and $I_{142}$ to the comparator 144.

Figure 18C:
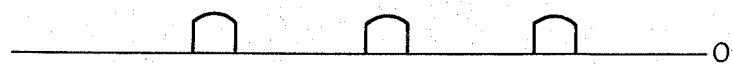
Figure 18D:
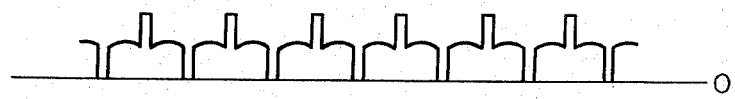
Figure 19:
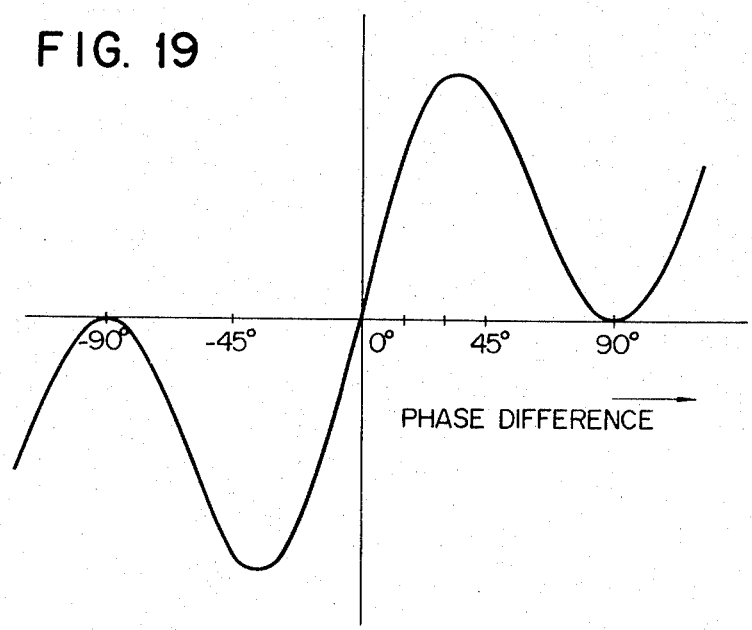
FIG. 19 gives characteristics of the phase difference detector of FIG. 17.

Output from the comparator 144 controls the signal $I_{139}$ at the gate 147. FIG. 18C indicates the wave form of output from the gate 148. FIG. 18D presents the wave form of a composite signal obtained by summing up outputs from the gates 147 to 150. FIG. 19 gives a value derived from the above equation (12). As seen from FIG. 19, there is obtained a maximum output when the phase difference indicates about 35°. In case of $-\pi/2 < \delta < \pi/2$, the output is rendered positive or negative according as the phase difference becomes positive or negative. In case of $|\delta| < \pi/12$, the output is substantially proportional to the phase difference.

There will now be discussed the phase difference detector in the aforementioned manner in connection with the rotating angle of a mirror. The phase difference detector can carry out detection at least when the mirror is inclined through a phase angle of less than 1°. Further, let it be assumed that two A and B in an interference field of view at which there are drawn out light signals $I_A$ and $I_B$ having a phase difference of $\delta$ are spaced 5 mm from each other and that part of the mirror corresponding to said space of 5 mm is moved with an error falling within the range of $1/360 \times \lambda/2$. Then the phase difference can be detected. When converted to the rotating angle of the mirror, the detected phase difference will indicate the following value $$\theta = 1/5 \times \lambda/2 \times 360 = 1.7 \times 10^{-7} \text{ (rad) or } 0.03 \text{ arc sec.}$$

This value far exceeds the sensitivity of an angle gauge such as an autocollimator which has heretofore been used in determining minute rotations.

When conducted through a low pass filter, output from the adder 153 can be substantially converted to D.C. current. When said output has a still lower frequency or a frequency falling within the D.C. range, then there is obtained a signal having such a wave form as shown in FIG. 18D. This output signal has a blind sector X and another sector Y where there is obtained a value twice the average value of outputs of the adder 153. Particularly where an object (the reference mirror 133) stands at rest, there possibly result determination errors. If the mirror is subjected to slight external vibrations corresponding to a fraction of the wave length of light, there can be obtained an average value of the aforementioned output from the adder 153. If, otherwise, the reference mirror 133 is under a stable rest position free from any such external vibrations, it is only required purposely to wave the mirror 135 slightly back and forth for vibrations in order to determine said average value. The more reduced the phase difference, the narrower the blind sector X and the Y sector where there is obtained a value twice that of the X sector. This means that smaller phase differences all the more minimize errors. Accordingly, the phase difference detector of this invention is most effective to determine extremely minute phase differences. Further, even when the reference mirror moves in the opposite direction, output from the adder 153 will not vary, provided the mirrors constituting an interferometer make a prescribed relative inclination. This is ascertained from the fact that the results arrived at by exchanging the upper limit of integration given in the equation (11) for the lower limit thereof to substitute $dx$ by $-dx$ are exactly the same as those obtained before such substitution.

The aforesaid phase fifference detector used light signals $I_A$, $I_B$, $I_C$ and $I_D$. However, this invention is not limited thereto, but permits various modifications thereof as $$I_a = I_0 \{1 + \sin(4\pi/\lambda)x\}$$
$$I_b = I_0 \{1 + \cos((4\pi/\lambda)x + \delta)\}$$
$$I_c = I_0 \{1 + \sin((4\pi/\lambda)x + 2\delta)\}$$
$$I_d = I_0 \{1 + \cos((4\pi/\lambda)x + 3\delta)\}$$
$$I_e = I_0 \{1 + \sin((4\pi/\lambda)x + 4\delta)\}$$
$$I_f = I_0 \{1 + \cos((4\pi/\lambda)x + 5\delta)\}$$

Because of $I_c - I_a = 2 I_0 \cos(4\pi/\lambda x + 2\delta) \sin \delta$, the difference signal is in the same phase as $I_c$. When, therefore, $I_c$ is used in controlling the gate, there is obtained, unlike the preceding case, an output proportional to $\sin 2\delta$, as naturally expected. To sum up, there are generated a plurality of first signals synchronizing with second two signals to be measured phase difference therebetween. The first signals have phases different from the second two signals by the total amount of an integral multiple and $n\pi/2$ of the phase difference of the amount of either the integral multiple or $n\pi/2$ thereof. There are selected two prescribed signals from among the plural first signals. The two first signals are supplied to the differential amplifier to take out the difference therebetween.

The phase difference detector of this invention is also applicable to all determinations based on detection by synchronization signals, for example, the measurement of the moved length of a carriage using the Moire fringes of an optical grid or a magnetic scale.

There will now be described the second to fourth embodiments of an apparatus for interferometric measurement of displacements. The parts of these embodiments the same as those of the first embodiment are denoted by the same numerals and description thereof is omitted.

Second Embodiment

Figure 20:
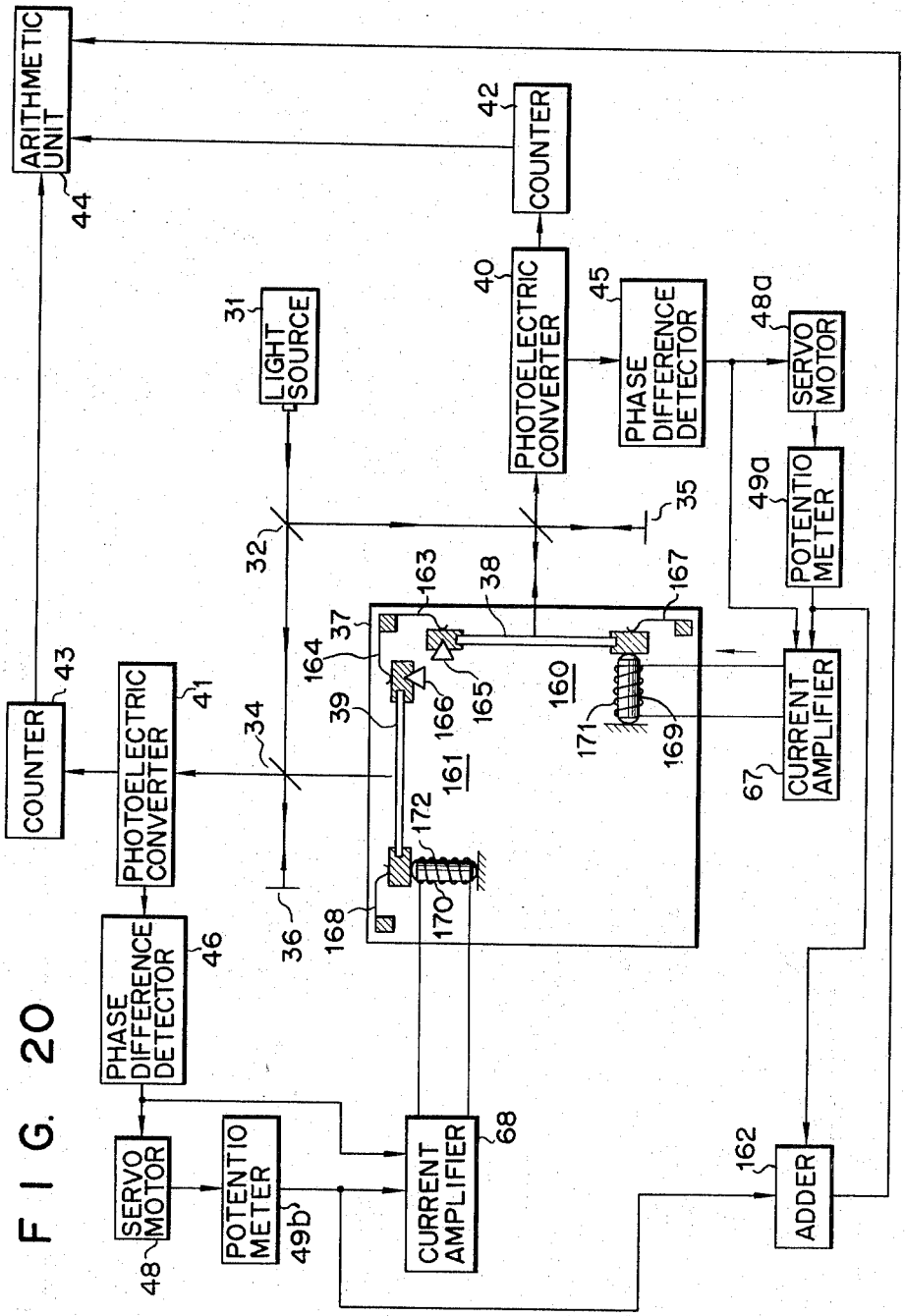
FIG. 20 is a block circuit diagram of an interferometric displacement measuring apparatus according to a further embodiment of the invention using a magnetostrictive element.

This embodiment mechanically corrects the travel of the movable mirrors fitted to the carriage 37 and detects the corrected values. As shown in FIG. 20, outputs from the phase difference detectors 45 and 46 are supplied to servo motors 48a and 48b respectively, which drive potentiometers 49a and 49b. Outputs from the potentiometers 49a and 49b are conducted to current amplifiers 67 and 68 respectively together with outputs from the phase difference detectors 45 and 46. Outputs from the current amplifiers 67 and 68 energize the servo actuators 160 and 161 fitted to the movable mirrors 38 and 39. Outputs from said current amplifiers 67 and 68 are also summed up by an adder 162 and supplied to an operation device 44 together with outputs from the counters 42 and 43. The displacement of the carriage 37 computed by the counters 42 and 43 is corrected by output from said adder 162, enabling the operation device 44 to figure out the true displacement of the carriage 37.

The ends on one side of the two movable mirrors 38 and 39 which are drawn near to each other are held between a plate spring 163 and a fulcrum 165 and between a plate spring 164 and a fulcrum 166 respectively. The ends on the other side of the movable mirrors 38 and 39 are held between a plate spring 167 and the operable end a magnetostrictive element 169 included in a servo actuator 160 and between a plate spring 168 and the operable end of a magnetostrictive element 170 included in a servo actuator 161 respectively. The magnetostrictive elements 169 and 170 are wound with coils 171 and 172 excited by outputs from the current amplifiers 67 and 68. The magnetostrictive elements 169 and 170 consist of alloys of nickel with iron or copper. In this case it is preferred that said magnetostrictive elements are thermally insulated from the coils 171 and 172 wound thereon and the outside.

If, in the aforementioned arrangement, bias current supplied to the coils 171 and 172 is previously so set as to cause outputs from the phase difference detectors 45 and 46 to have a minimum value or to be reduced to zero, then the rotating displacement of the carriage 37 resulting from its movement can be detected by the phase difference detectors 45 and 46. Detection outputs are amplified by the current amplifiers 67 and 68 and supplied to the coils 171 and 172.

The magnetostrictive elements 169 and 170 vary in length according to the energy of a magnetic feeld generated in the coils 171 and 172. The movable mirrors 38 and 39 rotate about the fulcrums 165 and 166 correspondingly to the movement of the carriage 37. Thus the normal direction of the movable mirrors 38 and 39 can always be aligned with the initially set direction. At this time, changes in outputs from the potentiometers 49a and 49b are averaged by an adder 162, and determined in the form of the minute rotating anglee $\Delta\theta$ of the carriage 37.

The varying numbers of interference fringes appearing in an interferometer provided with movable mirrors whose movement has thus been corrected can always be distinctly counted by the counters 42 and 43. It will be noted that changes in the number of interference fringes represent the displacement of the movable mirrors 38 and 39 and not that of the carriage 37 itself. The true displacement of the carriage 37 at given points $X_0$ and $Y_0$ is determined by the values obtained from the reversible counters 42 and 43, that is, on the basis on the coordinate the axes X and Y and the rotating angle $\Delta\theta$ of the carriage 37.

Since the movable mirrors 38 and 39 travel in parallel, the rotating center of the movable mirror 38 relative to the carriage 37, that is, the true displacement $(x_0, y_0)$ of the fulcrum 165 may be expressed as follows.

$$x_0 = X$$
$$y_0 = Y + (a/\sqrt{2})\Delta\theta$$

where;
$a$ = linear distance between the fulcrums 165 and 166.

It is assumed that the linear direction is inclined 45° to the X and Y axes.

Now let it be assumed that with the fulcrum 165 taken as the origin, the prescribed points on the carriage 37 as plotted on coordinates are measured from said base in units of mm and said coordinates are designated as $X_0$ and $Y_0$. Since the carriage 37 as a whole has rotated only through an angle of $\Delta\theta$ and the displacements of said points (on the coordinates $X_0$ and $Y_0$) on the carriage 37 have already been determined, the true displacements $(x, y)$ of said points $(X_0, Y_0)$ may be expressed as follows.

$$x = X + Y_0 \Delta\theta$$
$$y = Y + (a/\sqrt{2} - X_0)\Delta\theta$$

(12)

The second terms on the right side of the above equations represent corrected values. If said second term as a whole represents an effective number consisting of two places, it will well serve the purpose.

Therefore, $X_0$, $Y_0$, $a$ and $\Delta\theta$ may have a rough value having errors of several percents. Operation for correction of such counter values and indication of the displacement of the carriage 37 in metric units is performed by the operatio device 44.

Third Embodiment

Figure 21:
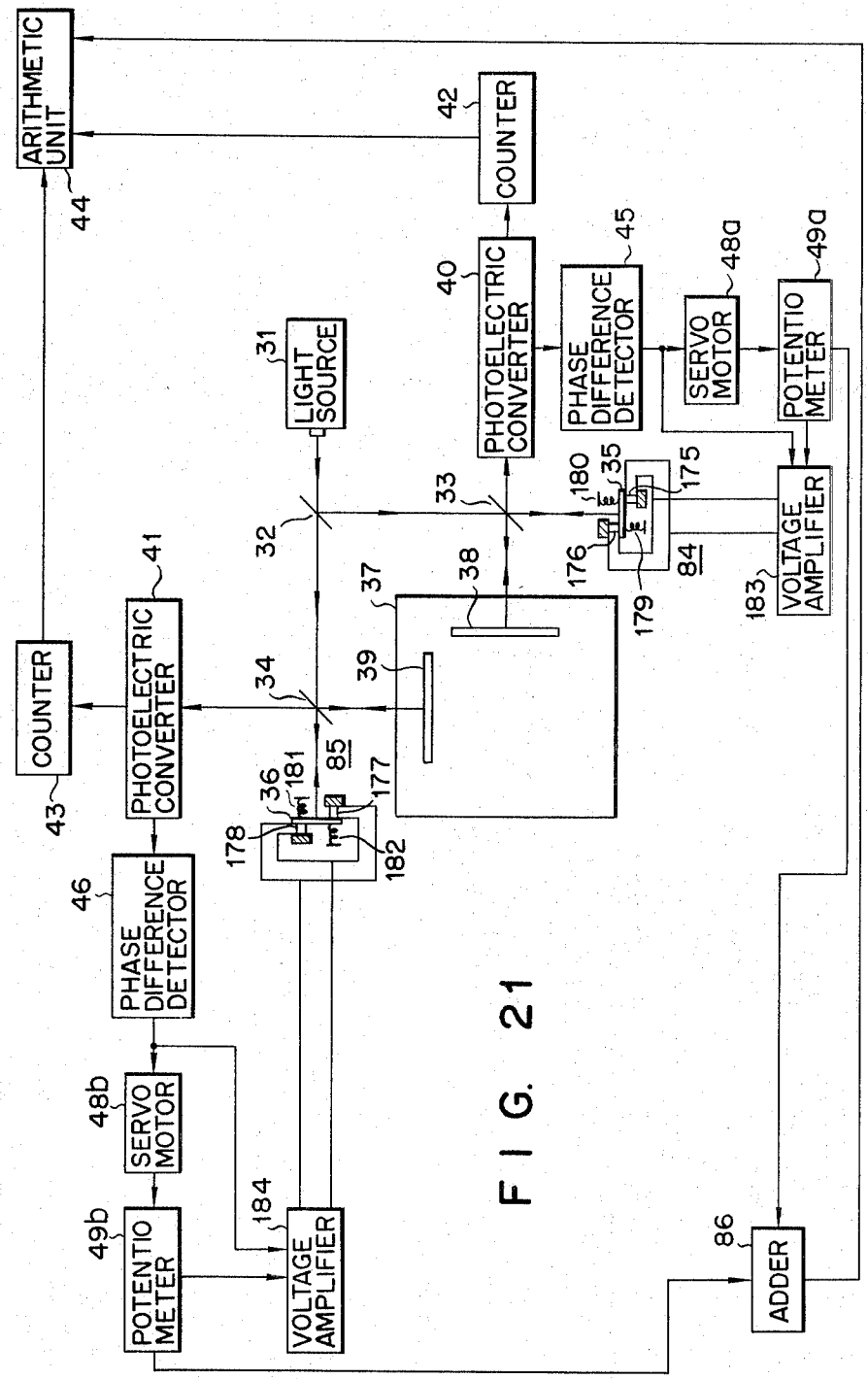
FIG. 21 is a block circuit diagram of an interferometric displacement measuring apparatus according to a further embodiment of the invention using a piezoelectric element.

Referring to FIG. 21, both ends of a reference mirror 35 are held between piezoelectric quartz elements 175 and 176 fixed at one end so as to face the reference mirror 35 and springs 179 and 180. Both ends of a reference mirror 36 are held between piezoelectric quartz elements 179 and 180 and springs 181 and 182. Across both ends of each of the piezoelectric quartz elements 175 and 176 is supplied voltage from a voltage amplifier 183, and across both ends of each of the piezoelectric quartz elements 179 and 180 is impressed voltage from a voltage amplifier 184. When impressed with voltage, the aforementioned piezoelectric elements present distortions in the direction in which there acts an electric field or at right angles to said direction. Said piezoelectric distortions are generally so small as about 0.1 micron. It is therefore preferred that the mutually facing piezoelectric elements 175, 176, 177 and 178 be each formed into a small size and so arranged as to enable the reflectors 35 and 36 to rotate effectively by minute piezoelectric distortions.

If, under the aforesaid arrangement, the piezoelectric elements 175, 176, 177 and 178 are previously impressed with such bias voltage as causes the phase difference detectors 45 and 46 to produce a minimum output, then the rotating or yawning displacement of the movable mirrors 38 and 39 resulting from the movement of the carriage 37 can be detected by said phase difference detectors 45 and 46. Detection outputs therefrom are amplified by the voltage amplifiers 183 and 184 respectively, and conducted to the piezoelectric elements 175, 176, 177 and 178. Said elements vary in size with the yawning displacement of the movable mirrors 38 and 39, causing the reference mirrors 35 and 36 to make such a rotating displacement as realizes the constant inclination of the movable mirrors to the images of the reference mirrors 35 and 36 with respect to the half mirrors 33 and 34 respectively. Outputs from the potnetiometers 49a and 49b are averaged by being summed up by an adder 185. From the outputs of the adder 185 and counters 42 and 43 and the other factors such as $\Delta\delta$, X and Y can be determined, as in the second embodiment, the true displacement of the carriage 37.

Figure 22:
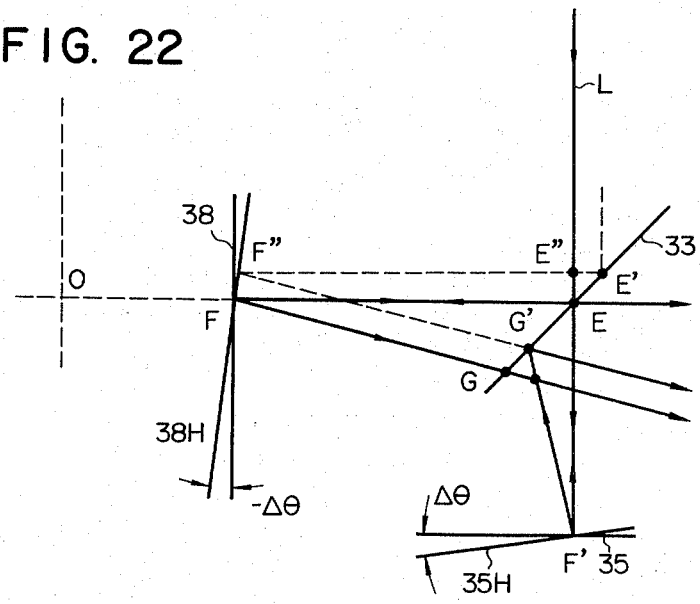
FIG. 22 illustrates the manner in which light interference takes place in the apparatus of FIG. 21.

There will now be described said determination in greater detail. Referring to FIG. 22, numerals 38 and 38H represent the positions of the movable mirror 38 before and after its rotation, and numerals 35 and 35H the positions of the reference mirror 35. In order to simplify the description, it is assumed that the normal of the surface of the movable mirror 38 and that of the reference mirror 35 are parallel to incoming light beams EF and EF' respectively. An incident light beam L is divided into two fluxes, one of which is directed to the point F and the other of which travels to the point F'. The movement of a rigid body accompanied with rotation may be deemed as a composition of its translation and its rotating displacement about a certain point. Here, the displacement of the movable mirror 38 is assumed to be a composition of its translation in the X and Y axes and its rotation about an intersection O defined by an extension of the incident light EF in the X axis with an extension of an incident light (not shown) in the Y axis. The true value of said translation is immediately determined by a counter and the rotating displacement is determined from the relationship described below. An optical path difference before the rotation of the movable mirror 38 may be expressed as $$2(EF - EF')$$

(13)

When, in case of EF $\neq$ EF', two light beams separated at the point E after the rotation of the movable mirror 38 are brought back to the half mirror 33 by reflection, then do not converge at a single point, but are, as illustrated, located apart at the points G and G'. A light beam interfering with a light beam F'G' is a light beam F''G' separated at the point E'. This phenomenon is known as the shearing of light beams. Since however, said shearing is so minute as about 1 to 2 microns, the interferometric capacity of the apparatus of this invention is not affected at all. Considering that the distances $E - E'$ and $G - G'$ and the angle $\Delta\theta$ represent very minute values and eliminating the similar minute values of the higher order, then the light path difference after the rotation of the movable mirror may be expressed as follows.

$$(E'F'' + F''G')(E''F' + F'G') \quad (14)$$

A balance between a light path difference before the rotation of the movable mirror and that after said rotation may be substnatially deemed as zero as apparent from a difference between the values of the equation (13) and (14). The true displacement of the base point O can be determined from readings on the counter (the base point does not originally shift as viewed from the stationary system, but may be deemed to be displaced as viewed from the carriage 37). Accordingly, the true displacement of a given point on the carriage 37 can be determined from counter readings X and Y and the rotating angle $\Delta\theta$ of the carriage 37, using the following equations.

$$x = X + Y_0\Delta\theta$$
$$y = Y - X_0\Delta\theta \quad (15)$$

Where $X_0$ and $Y_0$ jointly represent a coordinate system determined from the base point O after its displacement. If, in this case, the second terms on the right side of the above equations represent a rough value, it will well serve the purpose.

Calculation of the above equation (15) and indication of the calculated results in metric units are performed by the operation device 44.

Fourth Embodiment

Figure 23:
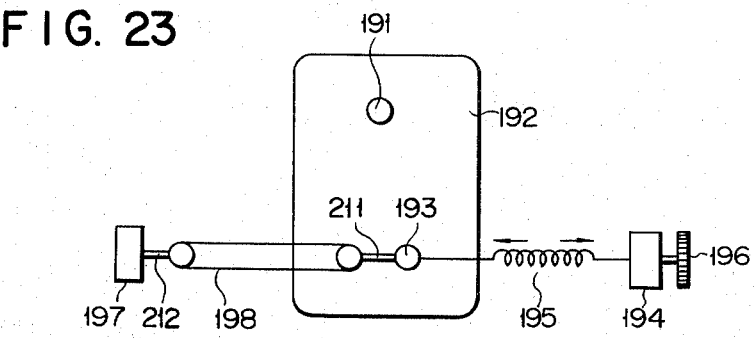
FIG. 23 is a top view of the carriage of an interferometric displacement measuring apparatus according to a still further embodiment of the invention where the measured movement of said carriage is corrected by the thermal expansion of a metal wire used in a correction device.

According to this embodiment, output from an amplifier 50 included in the interferometric measuring apparatus of the first embodiment is supplied to a displacement control device utilizing its own thermal expansion. Excluding said displacement control devie, the fourth embodiment consists of the same parts as the first embodiment and description thereof is omitted. Referring to FIG. 23, the carriage 37 consists of a carriage 192 fitted through a rotatable shaft 191 to a carriage base so as to rotate about said shaft 191. There is stretched a coil spring 195 between a support rod 193 fixed to the free end of the carriage plate 192 and a stationary member 194 fitted to the aforesaid carriage base. The spring 195 is connected at one end to the support rod 193 and at the other end to the end of an adjustment screw 196 engaging said stationary member 194. The tension of the coil spring 195 is increased or decreased by the rotation of said adjustment screw 196. To the carriage base is fitted another stationary member 197 so as to face the first mentioned stationary member 194 through the support rod 193. between said another stationary member 197 and support rod 193 is disposed a displacement control device 198. The coil spring 195 and displacement control device 198 are arranged substantially in a linear relationship so as to face each other across the support rod 193.

Figure 24:
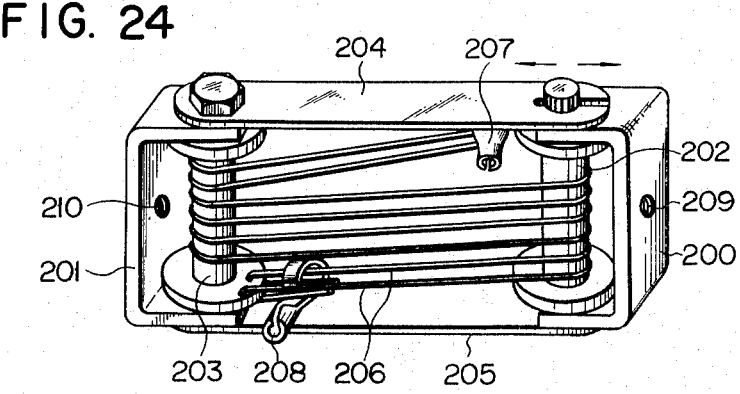
FIG. 24 is a perspective view of the correction device used in the apparatus of FIG. 23.

The displacement control device 198 is constructed as illustrated in FIG. 24. Two C-shaped fitting members 200 and 201 are spatially fitted columnar rigid insulation members 202 and 203 integrally provided with a flange at the top and bottom which are connected at the top and bottom by connection plates 204 and 205. Particularly, the insulation member 202 is so supported as to move lengthwise of said displacement control device 198. About both insulation members 202 and 203 are helically wound two parallel resistance wires 206, both ends of which are pressed against the flanged portions of the insulation members 202 and 203 by means of metal stoppers 207 and 208 concurrently acting as power supply terminals.

The displacement control device 198 constructed as described above is connected to the stationary member 197 and support rod 193 through connection rods 211 and 212 fitted by thread engagement into screw holes 209 and 210 bored through the side walls of the fitting members 200 and 201 respectively.

There will now be described the operation of the displacement control device 198. The rotating displacement of the carriage 37 resulting from its movement is detected by the phase difference detectors 45 and 46. Detected signals therefrom are conducted to the amplifier 50 through the adder-amplifier 47, servo motor 48 and potentiometer 49 together with output from said adder-amplifier 47. Upon receipt of output from the amplifier 50, the resistance wires 206 are supplied with current. Introduction of current results in the expansion of the resistance wires 206 due to heating. The carriage plate 192 is made to rotate together with the support rod 193 about the rotatable shaft 191 to the right of FIG. 23, that is, in the direction of the indicated arrow by the tension of the coil spring 195 according to the expansion of the resistance wires 206. Rotation of said carriage plate 192 stops when the normal of the movable mirrors 38 and 39 fitted to said plate 192 is aligned with the initially set position. The electric resistance R and spring constant K of the resistance wires 206 may be expressed as follows.

$$R = \rho(4Nl/2$$
$$K = Nn\pi dE/4l$$

where;

$l =$ distance between the insulation members 202 and 203

$N =$ number of turns of the paired resistance wires 206

$n =$ number of the individual wires $\rho =$ specific resistivity $E =$ Young's modulus of elasticity $d =$ diameter of the resistance wire When $d$ is first defined, R and K may be chosen from the above equations to have a desired value according to their relationship with $N$, $n$ and $l$.

Figure 25:
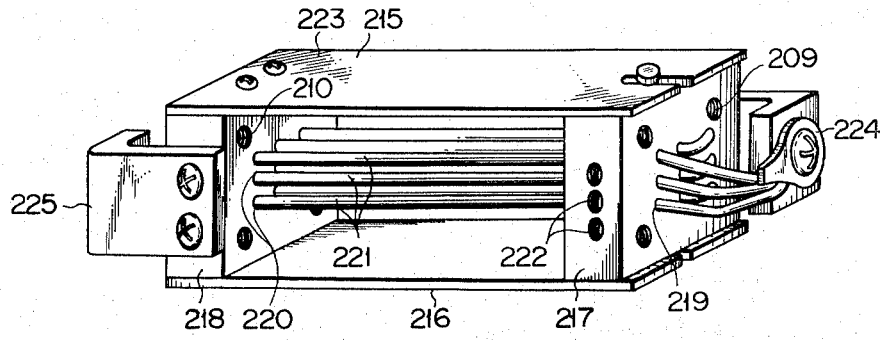
FIG. 25 is a perspective view of another type of correction device.

The aforementioned displacement control device may be constructed as shown in FIG. 25. Mutually facing insulation members 217 and 218 connected by connection plates 215 and 216 are perforated with a plurality of bores 219 and 220. Three resistance wires 221 grouped together pass through the bores 219 and 220 alternately from one side to the other, that is, in a zigzag fashion. These wires 221 are tightly set in place by stop screws 222 and 223 fitted to the insulation members 217 and 218. Both ends of said grouped resistance wires 221 are fitted to holders 224 and 225 fixed to the insulation members 217 and 218.

While the aforesaid embodiment is applicable to measurement of the bidimensional displacement of the carriage, it may also be used in determining not only the unidimensional but also tridimensional displacements thereof. For measurement of tridimensional displacements, there is required another interferometer in the Z axis of the carriage 37 in addition to those disposed on the X and Y axes and there are also provided two more phase difference detectors.

What is claimed is:

1. An apparatus for interferometric measurement of displacements which comprises: a carriage; two interferometers each of which includes a reference mirror, a half mirror and a movable mirror mounted on said carriage said interferometers arranged on axes which intersect at right angles; two photoelectric converteres one associated respectively with each of said interferometers and each having four photo-cells which convert four light signals appearing at four predetermined points in the interference field of view of the corresponding interferometer to four electrical signals respectively; two counters one connected respectively to said photoelectric converters to count interference fringes passing through the interference field of view according to the electrical signals from said photoelectric converter; two phase difference detectors connected respectively to said photoelectric converters to detect variations of the phase differences between said electrical signals from the corresponding photoelectric converter; and a correction device for correcting for rotational deviations of said carriage according to outputs from said phase difference detectors.

2. An apparatus according to claim 1 wherein said correction device comprises an adder amplifier connected to said phase difference detection for summing up and amplifying the outputs therefrom; a servo motor connected to be actuated by output from said adder-amplifier; a potentiometer driven by said servomotor; a power amplifier connected to said adder-amplifier and potentiometer for summing up and amplifying outputs therefrom; and a correction mechanism driven by the output from said power amplifier to correct for rotational deviation of said carriage.

3. An apparatus according to claim 2 wherein said carriage comprises a carriage base and a carriage plate fitted to said carriage base through a plurality of elastic members; and said correction mechanism comprises a motor mounted on said carriage base and driven by the output from said power amplifier; a lead screw rotated by said motor; a nut reciprocated by said lead screw; and means for causing minute rotations of said carriage according to the movement of said nut.

4. An apparatus according to claim 1 wherein said correction device includes two control devices coupled respectively to said phase difference detectors and each device comprising a servo-motor connected to be actuated by the output from said phase difference detector, a potentiometer driven by said servomotor and a current amplifier for summing up and amplifying the outputs from said potentiometer and said phase difference detector; an adder-amplifier connected to average the outputs from the potentiometers of said devices; two correction mechanisms mounted on the carriage and each actuated according to output from the current amplifier to correct the rotational deviation of said movable mirror so as to realize the constant inclination of the movable mirror to the image of the reference mirror with respect to the half mirror; and an arithmetic unit to arithmetically correct the values of said counters in accordance with the signal from said adder-amplifier obtained in response to the rotational deviation of the carriage, thereby to detect an actual displacement of the carriage.

5. An apparatus according to claim 4 wherein each of said correction mechanisms includes means for pivotally fitting one end of the movable mirrors to the carriage; and a plate spring and magnetostrictive element for holding the other end of said mirrors, said magnetostrictive element changing in size according to output current supplied thereto from the amplifier of said control device thereby giving a slight rotation to said movable mirror.

6. An apparatus according to claim 1 wherein said correction device includes two control devices coupled respectively to said phase difference detectors and each comprising a servo motor actuated by output from one of said phase difference detectors, a potentiometer adjusted by said servo-motor and a voltage amplifier for summing up and amplifying outputs from said potentiometer and said phase difference detector; a correction mechanism actuated by output from the voltage amplifier of said control device to pivot the reference mirror of the interferometer so as to realize the constant inclination of the reference mirror to the image of the movable mirror with respect to the half mirror; and an arithmetic unit to arithmetically correct the values of said counters including errors caused in accordance with the deviation of the carriage.

7. An apparatus according to claim 6 wherein each of said correction mechanisms comprises a pair of piezoelectric elements disposed in contact with both ends of the reference mirror of the interferometer with the reference mirror arranged between the piezoelectric elements each changing in size according to output voltage supplied thereto from said voltage amplifier of said control device and giving a slight rotation to said reference mirror.

8. An apparatus according to claim 1 wherein said phase difference detector comprises two differential amplifiers each making a difference signal between two prescribed signals selected from among the four signals from the four photo-cells; two inverters each changing the phase of the difference signal by 180 degrees; four gates each allowing or obstructing the passage of one of said difference signals from said differential amplifiers or said inverted signals from said inverters; four comparators each of which makes a comparison between one of the four signals from the photo-cells which substantially synchronize with said difference signals and one of two reference signals proportional to the intensity of a light source and which generates a signal to open one of said gates when said difference signal or its inverted signal presents a large amplitude; and an adder for summing up the difference signals and the inverted signals which have passed through said gates.

* * * * *